(No Model.) 3 Sheets—Sheet 1.
M. P. BOSS.
AMALGAMATING PAN AND SETTLER APPARATUS FOR TREATING ORES.
No. 315,893. Patented Apr. 14, 1885.
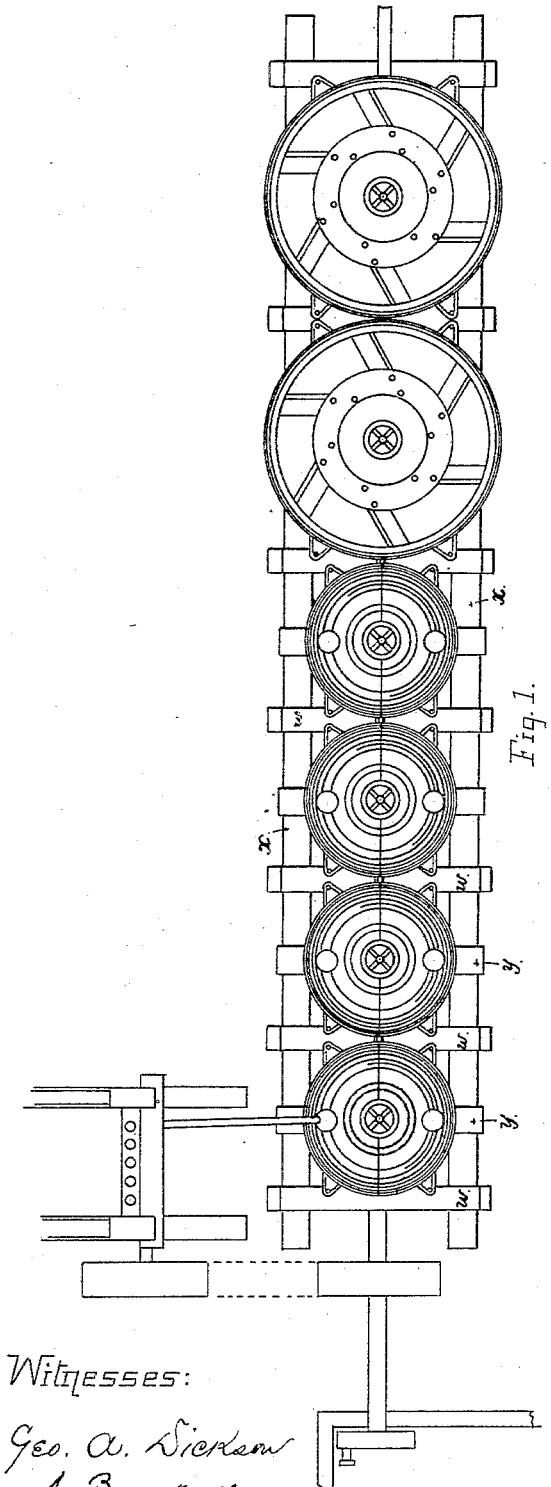
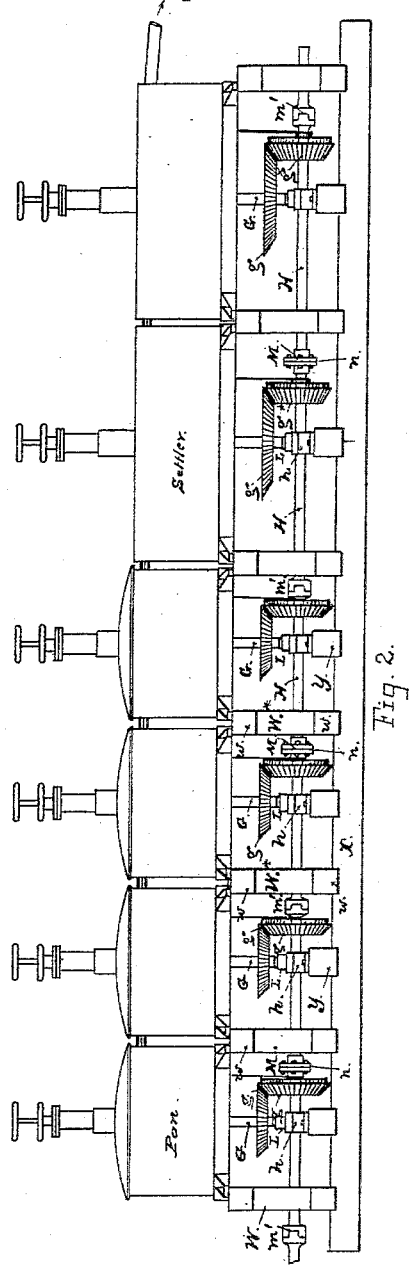
Witnesses:
Geo. A. Dickson
N. Barenkamp
Inventor:
Martin P. Boss.
per Edw. Osborn
Atty.

(No Model.) 3 Sheets—Sheet 2.

M. P. BOSS.
AMALGAMATING PAN AND SETTLER APPARATUS FOR TREATING ORES.

No. 315,893. Patented Apr. 14, 1885.

Witnesses:
Geo. A. Dickson
N. Barenkamp

Inventor:
Martin P. Boss
Edw... ...
Att'y (No Model.) 3 Sheets—Sheet 3.

M. P. BOSS.
AMALGAMATING PAN AND SETTLER APPARATUS FOR TREATING ORES.

No. 315,893. Patented Apr. 14, 1885.

Witnesses:
Geo. A. Dickson
A. Barenkamp

Inventor:
Martin P. Boss.
by E. A. Osborn
his Att'y.

UNITED STATES PATENT OFFICE.

MARTIN P. BOSS, OF OAKLAND, CALIFORNIA.

AMALGAMATING-PAN AND SETTLER APPARATUS FOR TREATING ORES.

SPECIFICATION forming part of Letters Patent No. 315,893, dated April 14, 1885.

Application filed December 16, 1884. (No model.)

*To all whom it may concern:*

Be it known that I, MARTIN P. BOSS, a citizen of the United States, residing in Oakland, Alameda county, in the State of California, have invented certain new and useful Improvements in Amalgamating-Pans and Settler Apparatus for Treating Ores of the Precious Metals; and I do hereby declare that the following is a full, clear, and exact description of my said invention, reference being had to accompanying drawings, in which—

Figure 3:
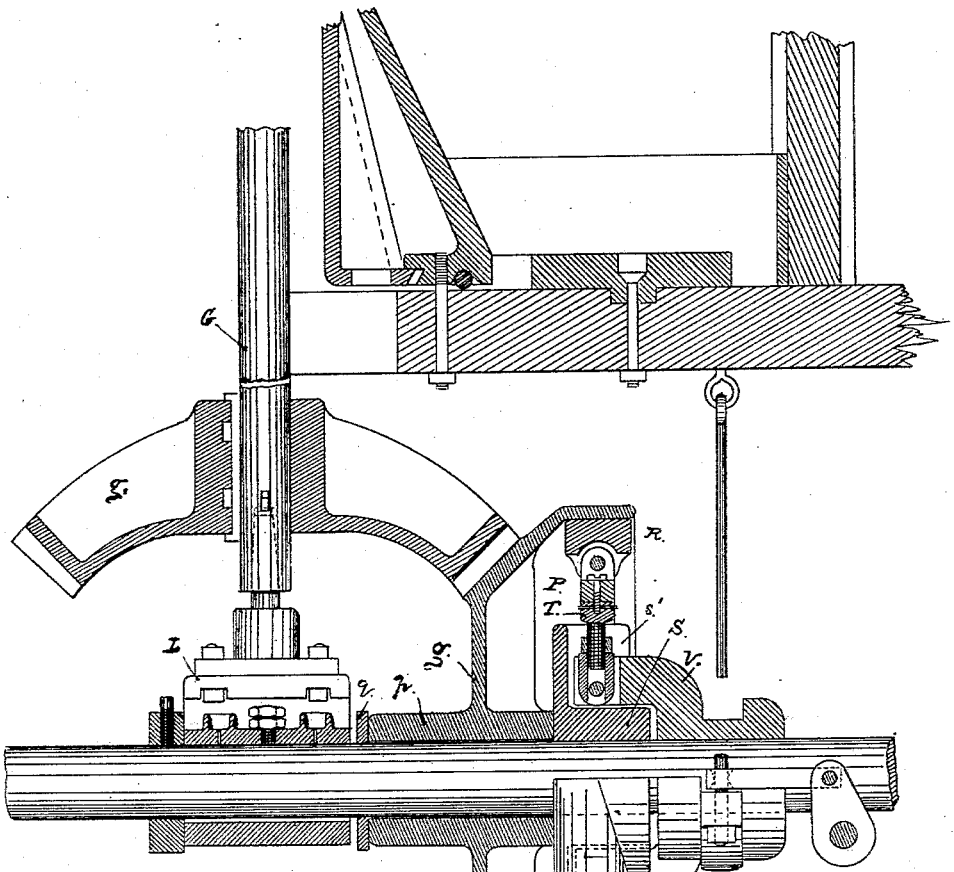
Figure 4:
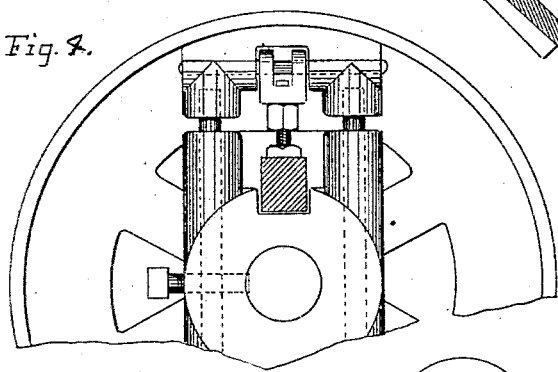
Figure 6:
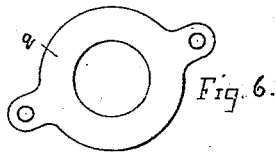
Figure 5:
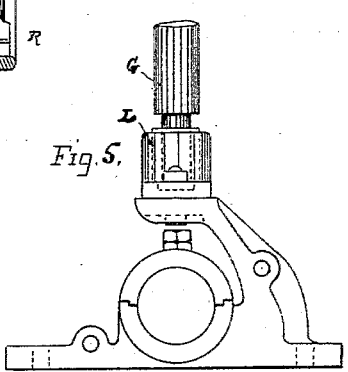
Figure 7:
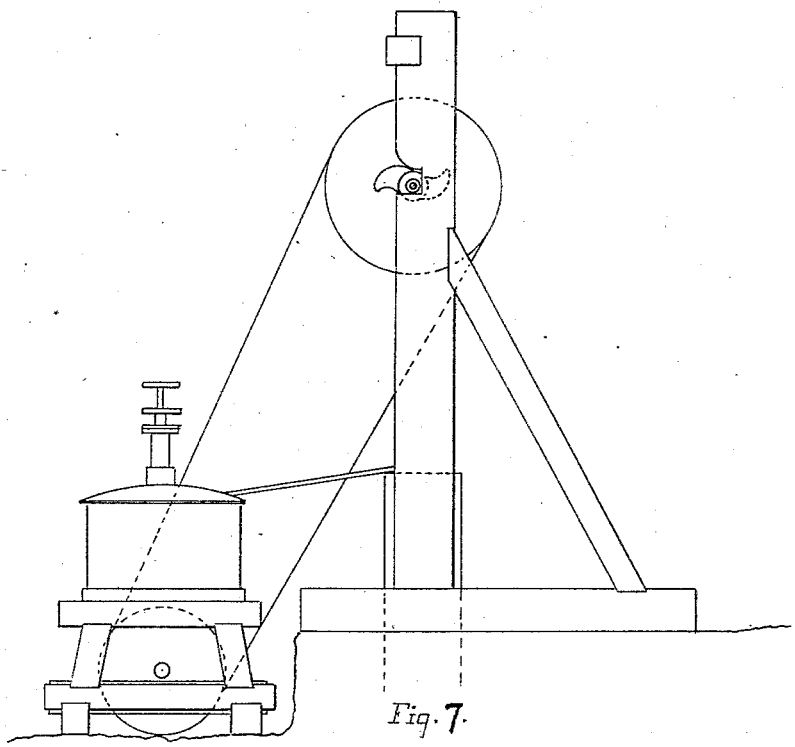
Figure 8:
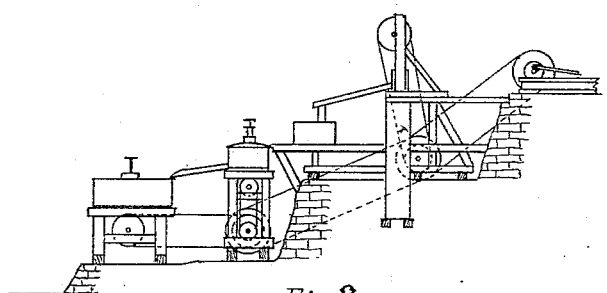

Figure 1 shows a plan view of the combination of a series of pans and settlers and a battery according to my invention. Fig. 2 is a front elevation of the pans and settlers. Fig. 3 shows the mode of driving the line of pans. Fig. 4 illustrates the general arrangement of such apparatus as hitherto in common use. Figs. 5, 6, and 7 are details of the driving-shaft and gearing by which a series of mullers are driven without belts and pulleys. Fig. 8 is an end elevation of an apparatus set upon suitable masonry at different levels.

My invention relates to improvements in apparatus for treating ores of the precious metals by what is known as the "pan process," where the pulverized ore from a mill or battery is carried through connected pans and settlers and the operation is continuous.

Prior to my present invention the pans and settlers in such a system were individually connected and were worked together in groups, two pans, and in some cases a single pan, to one settler, with a draw-off connection leading from the bottom of the pan, to discharge into the top of the settler, and the discharge being controlled by a valve or gate in the connection. The settlers, being placed on a lower level than the pans to permit of this discharge, had overflow-connections, also, one with another through long pipes that were inclined, to prevent filling up with the sand and suspended matter in the water. Such system, however, had many disadvantages and objections, chief among which were the cost of construction, the large area required for the plant, and the extent of building necessary to cover it, the cost of grading and the expense of retaining-walls, the difficulty of applying the power to the pans and settlers, and the large number of pipes, conductors, connections, and gates and valves between the several parts of the apparatus that were necessary.

In my improvement I employ no draw-off discharge from the pan into the settlers, and make no individual connection between the two; but I connect a number of pans in a row or series, and in convenient relation thereto a number of settlers in a similar continuous manner, and then, by means of one connection between the two series, I carry the flow of mingled pulp and water from the last pan to the first settler. I bring the settlers together in close order or relation, so that a short connecting-pipe serves to join one to the other, and I also bring the pans and settlers into such compact order and position that both the cost of construction and the labor of running such apparatus in the pan process is greatly reduced.

My improvement consists, first, in placing, arranging, and connecting a number of pans in a row or series and a number of settlers in a row or series, the receptacles of one series having individually no connection with or discharge into separate receptacles of the other series, and the connection of the two kinds of receptacles being only as to series.

It consists, secondly, in driving the muller-shafts of the whole set or series direct from the engine-shaft, and in the construction and combination of mechanism for that purpose.

I proceed to produce, carry out, and apply these parts and improvements as follows: Longitudinal timbers or sills X X upon a suitable bench or level form a solid base for a number of framed supports. The distance between the centers of these supports is regulated by the diameter of the pan and settler bottoms, so that one support receives two pans, while the height of the supports is such as to afford sufficient room for the driving-shaft and the connections underneath the whole set or row. Upon the sills are transverse timbers $y\ y$ for shaft-boxes $h\ h$. The framed supports consist of two horizontal timbers, $w$, at top and bottom, and upright timbers or legs $w^*$, that are framed into the horizontals and set with a slight rake or inclination outward. The top timbers receive the bottoms of two adjacent pans which are fastened down to the supports by flanges and bolts. The upright shaft G of each pan is carried at the lower end in a step-bearing, L, provided on the top of the shaft-box, and its connection with the driving-shaft is made by a miter-gear, g, and a driver, g*, on the horizontal shaft. These drivers are not rigid on the shaft, but each one is connected by a friction-clutch of such character that it locks the gear to the shaft under ordinary strain and conditions of work, but with any increase of resistance to the movement of the muller, and as this resistance becomes too great the clutch yields to the strain and relieves both the driving and the driven shaft.

The manner of operating a number of pans, in an apparatus of this kind, from one driving-shaft has been done heretofore by a system of pulleys and belts in which relief was obtained by the slip of the belt on its pulley at any one or more of the pans when the resistance was too great; but this mode has been found objectionable both in durableness of parts and in reliability, and it had no means of regulating the operation to make it operate with certainty.

The use of friction-clutches as I apply them permits the connection of the muller and the driving-shaft to be made with gearing, which has not heretofore been possible.

The driving-shaft H is made in sections, each one of which carries the gear and connected mechanism for one pan, so that the driving mechanism of any one pan is removed for repairs by detaching and taking out the section of shaft. This is done without disturbing the connections of the other pans to the shaft.

A construction of driving-gears and clutches on a section of shaft is shown in detail in Figs. 3, 4, and 5 of the drawings, and is given as a suitable construction for the purpose. I do not confine myself to any particular form or character of clutch, however, and I describe the one here shown simply for the purpose of giving a construction that I have found practicable. The driving-gear g* has a long hub, p, and is placed loosely on the shaft. It has a concentric rim that projects from the base of its beveled face, and is of sufficient width to give an internal surface for two friction-blocks, R R, to set against. Upon the shaft a box, S, furnishes guides s' s' for two toggles, T T, that are attached at their outer ends to the frictional blocks R. The inner ends of the toggles are attached by joints to the arms or extensions of a sliding hub, V. This hub turns with the shaft, but is free to slide longitudinally, and the toggles T are attached to it by hinge-joints. A longitudinal movement of the part V in one direction draws the blocks T away from the rim, and in the other direction sets them against the rim and locks the gear. The rods T are extensible, as shown, so that the amount of friction between the surfaces of the clutch can be regulated to any required degree of resistance. The shaft-sections are of equal length, and there is one section to each pan. One end of the shaft has the half of an ordinary flange-coupling, M, to join the corresponding end of the next section, and the opposite end of the shaft has the one half or part of a clutch-coupling, m'. When the sections are set in line, the flanged ends of every two sections are united by bolts in the usual manner. This leaves the clutch ends m' of every two sections facing each other, and the line of shaft is completed by joining them together. Between the two flanges, at the time of coupling, a ring or collar, n, is inserted, the thickness of which is equal to the amount of longitudinal movement required to separate the two parts of the clutch-coupling. To remove a section of shaft, the flange-coupling is first separated, and the ring n is then drawn out to permit the shaft to slide back.

The operation of taking out any one of the shaft-sections and the connected mechanism is very simple, as will be readily understood, and the gears and parts of any one can be repaired at any time without disconnecting or disturbing the other pans and their driving mechanism.

Instead of requiring several benches and retaining-walls, as in other constructions generally used and found necessary, I require only a small difference in level between the battery and the row of pans, and in addition to the great reduction in the cost of this part of the work I am able to run the pans direct from the engine-shaft, to dispense with counter-shafts and the large number of belts and pulleys heretofore required in the ordinary system, and to bring the apparatus into such close compact form that it can be managed and its operation supervised by a less number of workmen. These points and features, by which I secure the advantages hereinbefore described, will be well understood by comparison of the ordinary mode of setting up and arranging a battery, its pans and settlers, as illustrated in Fig. 8, with my improvements, as shown by the view, Fig. 7.

Having thus fully described my invention, what I claim, and desire to secure by Letters Patent, is—

1. The combination, in an apparatus for treating ores by the pan process, of a series of amalgamating-pans in line and close connection, and a series of settlers individually disconnected and separate from the pans, but connected in a series, and the two series being arranged upon the same level and connected together to discharge by overflow from one series into the other, substantially as set forth.

2. The combination, in an apparatus for treating ores by the pan process, of a series of connected pans and a series of connected settlers upon the same bench or level in relation to a line of driving-shaft, and mechanism connecting the upright shaft of each pan and settler with said driving-shaft, substantially as set forth.

3. The combination, with a series of pans in line upon the same bench or level, of a common driving-shaft having a set of gears, of which each one is connected to the shaft by a friction-clutch, and is set to engage with a bevel-gear fixed on the muller-shaft of each pan, substantially as set forth.

4. The driving-shaft composed of slip sections or lengths, each of which is provided with a flanged coupling on one end and a clutch-coupling on the other end, to engage with corresponding couplings of the adjacent sections, and the interposed removable rings, substantially as set forth.

MARTIN P. BOSS. [L. S.]

Witnesses:
EDWARD E. OSBORN,
N. BARENKAMP.